US012787042B2

(12) United States Patent
Fouad et al.

(10) Patent No.: US 12,787,042 B2
(45) Date of Patent: Nov. 3, 2026

(54) SYSTEM AND METHODS FOR SIDELINK UNLICENSED CHANNEL ACCESS AND FEEDBACK OPERATIONS

(71) Applicant: Samsung Electronics Co., Ltd., Suwon-si (KR)

(72) Inventors: Yaser Mohamed Mostafa Kamal Fouad, San Diego, CA (US); Philippe Jean Marc Michel Sartori, Naperville, IL (US); Jung Hyun Bae, San Diego, CA (US); Liang Hu, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/525,259

(22) Filed: Nov. 30, 2023

(65) Prior Publication Data

US 2024/0205945 A1 Jun. 20, 2024

Related U.S. Application Data

(60) Provisional application No. 63/433,703, filed on Dec. 19, 2022.

(51) Int. Cl.
*H04W 72/40* (2023.01)
*H04W 72/0446* (2023.01)
*H04W 72/25* (2023.01)

(52) U.S. Cl.
CPC ....... *H04W 72/40* (2023.01); *H04W 72/0446* (2013.01); *H04W 72/25* (2023.01)

(58) Field of Classification Search
None
See application file for complete search history.

(56) References Cited

U.S. PATENT DOCUMENTS

| | | | | |
|---|---|---|---|---|
| 11,647,540 | B2 | 5/2023 | Lee et al. | |
| 12,507,261 | B2 * | 12/2025 | Hong | H04L 5/0051 |
| 2003/0207675 | A1 * | 11/2003 | Hughes | H04B 1/109 455/234.1 |
| 2022/0400484 | A1 | 12/2022 | Lee et al. | |
| 2022/0407645 | A1 * | 12/2022 | Wang | H04L 5/0048 |
| 2023/0073421 | A1 * | 3/2023 | Ryu | H04L 5/0091 |
| 2023/0146928 | A1 * | 5/2023 | Hwang | H04W 52/325 370/329 |

(Continued)

*Primary Examiner* — Melanie Jagannathan
(74) *Attorney, Agent, or Firm* — Womble Bond Dickinson (US) LLP

(57) ABSTRACT

A system and a method are disclosed for processing, by a user equipment (UE), a first automatic gain control (AGC) symbol at a first slot of a wireless transmission; receiving, by the UE, an indication of a number of AGC symbols for processing in the wireless transmission; and determining, by the UE and based on the indication received, whether to process at least a second AGC symbol of the wireless transmission. The indication may include information that at least the second AGC symbol exists in a subsequent slot of the wireless transmission and the UE may further processing, based on the determination and indication, at least a second AGC symbol. The UE may further send, to a separate transmitting (Tx) UE, a request to send the wireless transmission comprising multiple AGC symbols, wherein the indication is based on the request sent to the Tx UE.

20 Claims, 8 Drawing Sheets
(3 of 8 Drawing Sheet(s) Filed in Color)

(56) References Cited

U.S. PATENT DOCUMENTS

| | | | | |
|---|---|---|---|---|
| 2023/0148141 | A1 | 5/2023 | Hu et al. | |
| 2023/0199675 | A1* | 6/2023 | Ryu | H04W 52/52<br>370/329 |
| 2024/0381376 | A1* | 11/2024 | Ryu | H04L 5/0053 |
| 2025/0220596 | A1* | 7/2025 | Wang | H04W 52/52 |
| 2026/0046926 | A1* | 2/2026 | Hoang | H04W 72/40 |

* cited by examiner

SYSTEM AND METHODS FOR SIDELINK UNLICENSED CHANNEL ACCESS AND FEEDBACK OPERATIONS

CROSS-REFERENCE TO RELATED APPLICATION

This application claims the priority benefit under 35 U.S.C. § 119(c) of U.S. Provisional Application No. 63/433,703, filed on Dec. 19, 2022, the disclosures of which are incorporated by reference in their entirety as if fully set forth herein.

TECHNICAL FIELD

The disclosure generally relates to new radio (NR) sidelink (SL) channel communications. More particularly, the subject matter disclosed herein relates to improved NR SL communications systems and protocols for use in unlicensed spectrums of wireless bands.

BACKGROUND

In 5G user device (UE) operations, Listen-Before-Talk (LBT) operations are used to prevent signal collisions among multiple devices. When operating in the unlicensed spectrum, NR coexist and contend for resources with other NR UEs as well as other systems that are operating in the unlicensed spectrum (e.g., WiFi). In the unlicensed band, sidelink UEs are required to abide with extra regulations. In particular, an NR UE needs to perform the LBT procedure to avoid collisions with other systems' transmissions on top of its Mode 2 resource selection procedure.

However, LBT procedures are subject to errors. Since the LBT sensing duration can be random, even after having a successful LBT, a UE might be required to wait until the next slot boundary of its reserved slot to perform its transmission thus increasing its chances of losing the channel to other devices. This leads to inefficient utilization of vital signal and hardware resources that will disrupt wireless operations.

New standards have proposed a mini-slot structure to allow NR UEs to utilize two starting positions within a slot to combat LBT errors and improves the chances of an NR UE in acquiring a channel by creating multiple LBT sensing opportunities for each slot. However, an issue with this approach is that all UEs will not have the same starting symbol for their transmissions, thus creating an interference imbalance within a slot and badly disrupting wireless signal operations.

In an embodiment discussed herein, a method comprises processing, by a user equipment (UE), a first automatic gain control (AGC) symbol at a first slot of a wireless transmission; receiving, by the UE, an indication of a number of AGC symbols for processing in the wireless transmission; and determining, by the UE and based on the indication received, whether to process at least a second AGC symbol of the wireless transmission.

In various embodiments the method further comprising refraining, by the UE and based on the determination, from processing a second AGC symbol, wherein the determination is based on information in the indication that only one AGC symbol is transmitted in the first slot of the wireless transmission. In various embodiments, the method further comprising processing, by the UE and based on the determination, at least a second AGC symbol. In some further embodiments, the indication includes information that at least the second AGC symbol exists in a subsequent slot of the wireless transmission.

In various embodiments, the method further comprises sending, by the UE to a separate transmitting (Tx) UE, a request to send the wireless transmission comprising multiple AGC symbols, wherein the indication is based on the request sent to the Tx UE. In some further embodiments, the method comprises receiving, by the UE from the Tx UE, the wireless transmission. In other further embodiments, the request sent to the Tx UE to send the wireless transmission comprising multiple AGC symbols comprises a pre-configured physical sidelink feedback channel (PSFCH) resource including a preferred number of AGC symbols to a separate transmitting UE, and wherein the indication received by the UE is sent by the Tx UE based on the sent PSFCH resource.

In various embodiments, the indication is included in sidelink control information (SCI) of one or more physical sidelink control channel (PSCCH) blocks in one or more slots subsequent to the first AGC symbol. In some further embodiments, the SCI indicates at least an additional AGC symbol in a slot subsequent to the one or more slots subsequent to the first AGC symbol. In various embodiments, the indication is part of medium access control control element (MAC CE) and is carried in the physical sidelink shared channel (PSSCH).

BRIEF DESCRIPTION OF THE DRAWINGS

The patent or application file contains at least one drawing executed in color. Copies of this patent or patent application publication with color drawing(s) will be provided by the Office upon request and payment of the necessary fec.

In the following section, the aspects of the subject matter disclosed herein will be described with reference to exemplary embodiments illustrated in the figures, in which.

DETAILED DESCRIPTION

Figure 1:
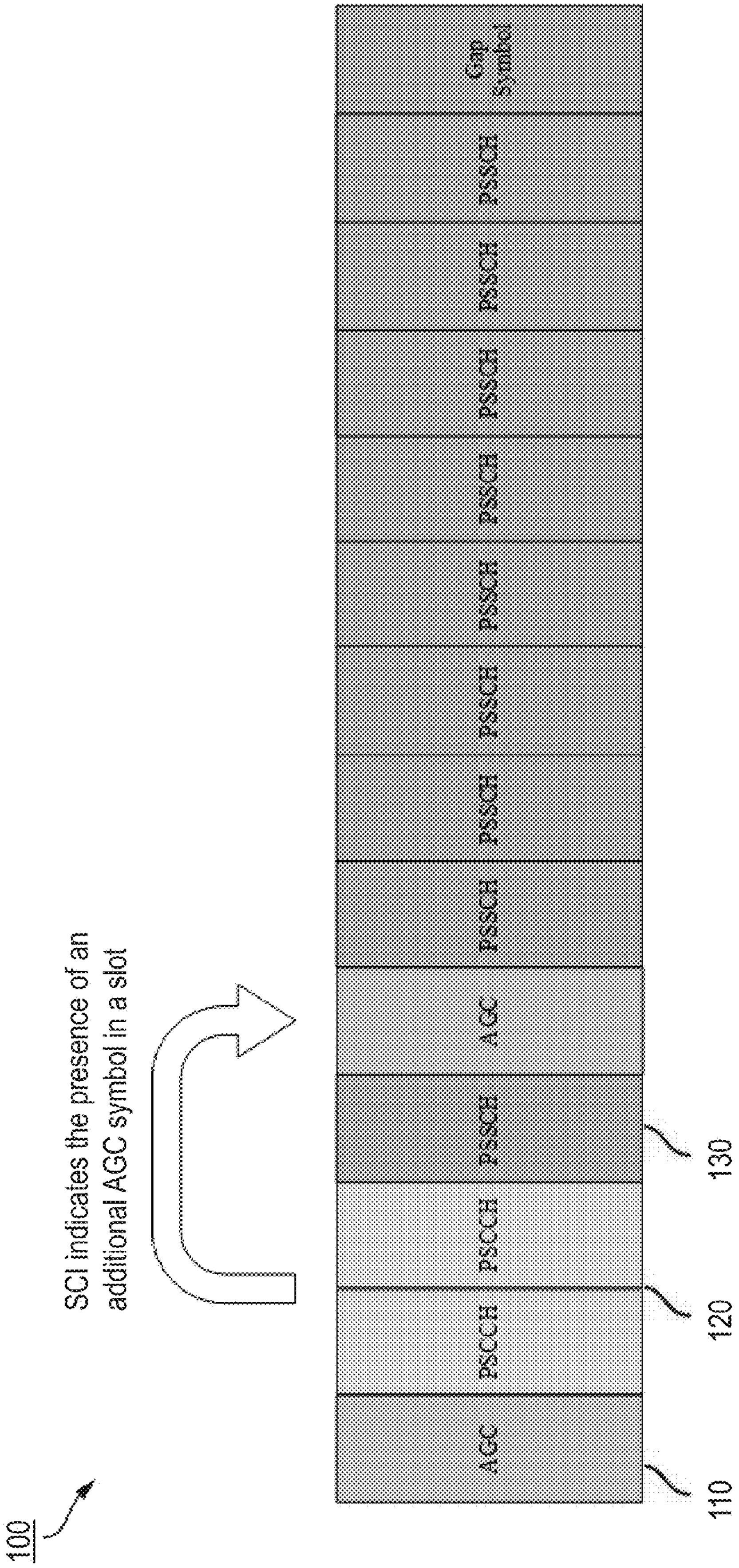
FIG. 1 depicts a block diagram illustrating an example transmission including multiple automatic gain control (AGC) blocks according to various embodiments.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

As used herein, the term "pre-configured" may refer to any combination of pre-configured or configured without specific limitation to the time period in which a method, system, device or instruction may be or have been configured.

Issues with contemporary sidelink operation of NR UEs are described above, including in the summary section. Power imbalances within a slot creates issues for a first transmitting UE, since after a second UE starts transmitting, the overall received power increases, and the initial AGC setting will not be valid anymore, thus resulting in degraded reception. This results in inefficient and disruptive performance in wireless networking, which is a highly regulated area governing a large number of interconnected devices. Therefore, there is a need for a system and method for UEs to be able to adapt to varying received power level within a slot.

Indication and Resolution of Additional AGC Symbols

As described above, when transmitting in the unlicensed band, NR UEs are expected to have a successful LBT before transmitting. This adds an additional restriction on NR UEs since they are only be allowed to transmit at the slot boundary. The NR Rel-18, the concept of mini-slots was introduced for SL transmissions to increase their chances of having a successful LBT and perform a transmission by allowing two starting positions within a slot. In this case, some UEs will require two AGC symbols to be able to perform additional AGC training and accordingly adjust their gains.

In various embodiments, a UE may dynamically adjust the number of AGC symbols per slot. In particular, a transmitting (Tx) UE can indicate to a receiving (Rx) UE, the number of AGC symbols within a slot and accordingly the Rx UE can decode the payload carried in the PSSCH. In some embodiments, this indication can be carried in the 1st stage SCI in the PSCCH or in the 2nd stage SCI in the PSSCH or as a MAC CE that is carried in the PSSCH. In some embodiments, this indication is explicit by setting one or bits within the 1 st or 2nd stage SCI or by using a dedicated MAC CE.

FIG. 1 depicts a block diagram illustrating an example transmission including multiple automatic gain control (AGC) blocks according to various embodiments. Specifically, FIG. 1 depicts transmission 100 including a number of blocks corresponding to an NR SL operation. First AGC block 110 represents the first block in the transmission and is utilized for AGC training, wherein a UE may detect neighboring UEs.

Physical Sidelink Control Channel (PSCCH) blocks 120 correspond to PSCCH data in one or more blocks following the first AGC block 110. PSCCH blocks 120 are utilized to carry sidelink control information (SLI), which indicates transmission properties of Physical Sidelink Shared Channel (PSSCH) that follow the PSCCH blocks 120. According to various embodiments described herein, the PCCH blocks 120 may carry, in the SLI, an indication of a second AGC block 130 that will follow PSCCH blocks 120. The second AGC block 130 may be utilized, for example, to reperform initial AGC training and accordingly adjust signal gain to avoid potential signal degradations. Though transmission 100 is depicted in FIG. 1 as having multiple AGC blocks 110 and 130, it will be appreciated that in many cases, transmission may only have a single AGC block 110. Thus, signaling from the SLI of PSCCH block(s) 120 whether multiple AGC blocks exist in a transmission will allow for the use of multiple AGC blocks without the unnecessary overhead of always trying to process multiple AGC blocks.

In various alternative embodiments, the indication of AGC symbols can also be implicit by setting one or more fields in the $1^{st\ or}$ $2^{nd}$ stage SCI to (pre)-configured values. For example, a reserved periodicity value utilized when performing a SL unlicensed transmission can be used to indicate the number of AGC symbols within a slot. The reserved value may be pre-configured per resource pool, for example.

In some further embodiments, to reduce the signaling overhead when more than two AGC symbols are needed within a slot, multiple numbers of AGC symbols can be pre-configured per resource pool and only the index can be signaled to the Rx UE in the SCI. For example, 2 or 3 AGC symbols per slot can be pre-configured per resource pool and the Tx UE may use one bit to indicate the number of AGC symbols per slot from the pre-configured values. The indication of AGC may occur on any combination of multiple scenarios: 1) only as part of the current transmission; 2) the current and future transmissions are indicated by other fields (e.g.,TRIV and FRIV fields); 3) the current and future transmissions indicated by other fields (e.g., the TRIV, FRIV field) and period fields. A selection between these options can be pre-configured per resource pool or it can be based on the design.

In various further embodiments, the number of AGC symbols per slot can be pre-configured based on transmission priority. For example, higher priority UEs might be given higher protection against interference by being allowed to use a larger number of AGC symbols. In some alternative embodiments, when higher priority UEs are less likely to have interfering UEs due to their inherent protection from the underlying RSRP thresholds for resource selection in the Mode 2 resource selection procedure, then these UEs might be given more freedom to have higher slot efficiency and a smaller number of AGC symbols to be able to transmit more data.

The number of AGC symbols may be also dependent on the cast type. For instance, two AGC symbols can be used in case of broadcast due to the absence of feedback whereas groupcast Options 1 and 2 or unicast transmissions can rely on 1 AGC symbol to improve the slot efficiency and accordingly perform a retransmission in case of failure. In some alternative embodiments, for groupcast Option 1, the use of one or two AGC training symbols can be dependent on the target range indicated in the $2^{nd}$ stage SCI. This correlates with the concept of the higher this range, the larger the chances of having interfering UEs, and thus more protection might be provided (i.e., a larger number of AGC symbols).

In various embodiments, if a shorter range is used, a smaller number of AGC symbols may be used in order to improve the slot utilization. In addition, the number of AGC symbols can be dependent on whether the UE is performing a transmission or a retransmission and the number of blind retransmissions. In particular, if a UE is performing the initial transmission, it can use just one AGC symbol, whereas if it is a retransmission, it may use a larger number of AGC symbols to increase the chances of a successful decoding at the Rx UE. In some similar embodiments, if a UE is performing multiple blind retransmissions then it can use lower number of AGC symbols to improve the slot efficiency.

In some embodiments, the number of AGC symbols utilized is dependent on the measured CBR, whereas a higher CBR than a particular threshold would require more AGC symbols to potentially increase the chances of having a successful transmission. In some embodiments, this CBR can be measured at either the Tx or Rx UEs side. In addition, an approach similar to the contention window size adjustment may be considered for the number of AGC symbols wherein a reference duration is used to identify the presence of other systems and accordingly if an ACK is received during this reference duration then the UE can perform a transmission with a smaller number of AGC symbols and vice versa. In such cases, the Tx UE may indicate the number of AGC symbols to the Rx UE.

In some further embodiments, the number of AGC symbols may correspond to the contention window size whereby using a contention window size above a certain threshold will indicate a highly occupied system. Accordingly, a larger number of AGC symbols can be used, whereas using a smaller contention window size will indicate a less occupied system and accordingly a smaller number of AGC symbols can be used to improve the slot utilization. In various embodiments, the use of one or more AGC symbols can be based on a request received from the Rx UE. In particular, similar to the inter-UE resource selection assistance approach of Rel-17, the Rx UE can indicate high interference conditions to the Tx UE and accordingly request a specific number of AGC training symbols to utilize. In some alternative embodiments, the request from the Rx UE can be based on a capability exchange when the Rx UE indicates to the Tx UE that there is no need for additional AGC symbols, as will be discussed below.

In various embodiments, the number of AGC symbols to use per slot can also be selected by the Rx UE and indicated using inter-UE coordination message. For example, in case of resource selection assistance Scheme 1, the Rx UE can indicate the number of AGC symbols per slot to the Tx UE along with the preferred or non-preferred resource sets. In some additional embodiments, in case of resource selection assistance Scheme 2, a different PSFCH resource (e.g., an additional cyclic shift) can be used to indicate the number of AGC symbols per slot to use by the Tx UE. This PSFCH resource may be sent in addition to that used for conflict indication and/or it can be sent simultaneously with the conflict indication by selecting a different cyclic shift or PRB within the PSFCH channel (i.e., a different PSFCH resource).

In an example of the above, an Rx UE may send a Zadoff-Chu sequence with cyclic shift 0 in PRB "X" to indicate a conflict indication and another Zadoff-Chu sequence with cyclic shift 3 in PRB "Y" to indicate a request for 2 AGC symbols per slot. In this case, if the second sequence sent on PRB "Y" is not detected, the Tx UE may revert back to a default pre-configured or its own selected number of AGC symbols per slot. In various embodiments, the conflict indication and the number of AGC symbols can be combined together. In particular, it can be pre-configured that whenever a conflict indication is received then two AGC symbols will be used or a UE can be assigned two cyclic shifts for conflict indication, wherein using the first sequence indicates a conflict indication and a request for one AGC symbol per slot, whereas using the second sequence indicates a conflict indication and a request for two AGC symbols per slot.

In various embodiments, the use of a second AGC symbol can be pre-configured per resource pool. In such a case, the configuration can be done by RRC signalling and may indicate: 1) the use of one AGC symbol only (e.g. no signalling change needed, the Rel-17 signalling can be used as is); and/or 2) the use of one or two AGC symbols through an additional RRC field.

In various embodiments, a decision upon whether to use one or two AGC symbols may be dependent on several conditions, such as: 1) the priority of the transmission (e.g., high-priority transmissions may be using two AGC symbols to maximize the chances of a successful transmission on the first attempt. Lower priority packets may only use one transmission); 2) the packet delay budget of the transmission; 3) the required QoS of the packet transmission; 4) the observed CBR (in low CBR conditions, where traffic is low, the UE may only use a single AGC symbol, the rationale being that radio conditions are often good and interference is likely to be low); or 5) any combination of the above.

The above conditions may involve additional RRC signalling (e.g., priority threshold, CBR threshold) to indicate when the UE may utilize one or two AGC symbols. In various embodiments, the resource pool configuration may also indicate that the transmitting UE is permitted to use up to two AGC symbols, but may choose only one if desired or needed. The UE may then utilize internal criteria to determine whether to select one or two AGC symbol.

The Rx UE may additionally employ various technique to identify a number of AGC symbols per slot. In various embodiments, the Rx UE may utilized one or more rules to identify the number of AGC symbols per slot including: 1) always attempt to perform AGC on the first symbol within the slot; 2) if an indication is received for the presence of another AGC symbol; or if a request is sent for an additional AGC symbol within this slot to the Tx UE, then attempt to perform AGC on the second symbol location within the slot and accordingly adjust the gain; 3) If an indication is received for the presence of only one AGC symbol, do not attempt to perform AGC on the second symbol location within the slot and accordingly adjust the gain; and/or 4) if no indication is received and in the absence of a request of a specific number of AGC symbols, then it is defaulted to UE implementation as to whether to attempt to perform AGC only in the first symbol or in the two symbols within the slot.

Figure 2:
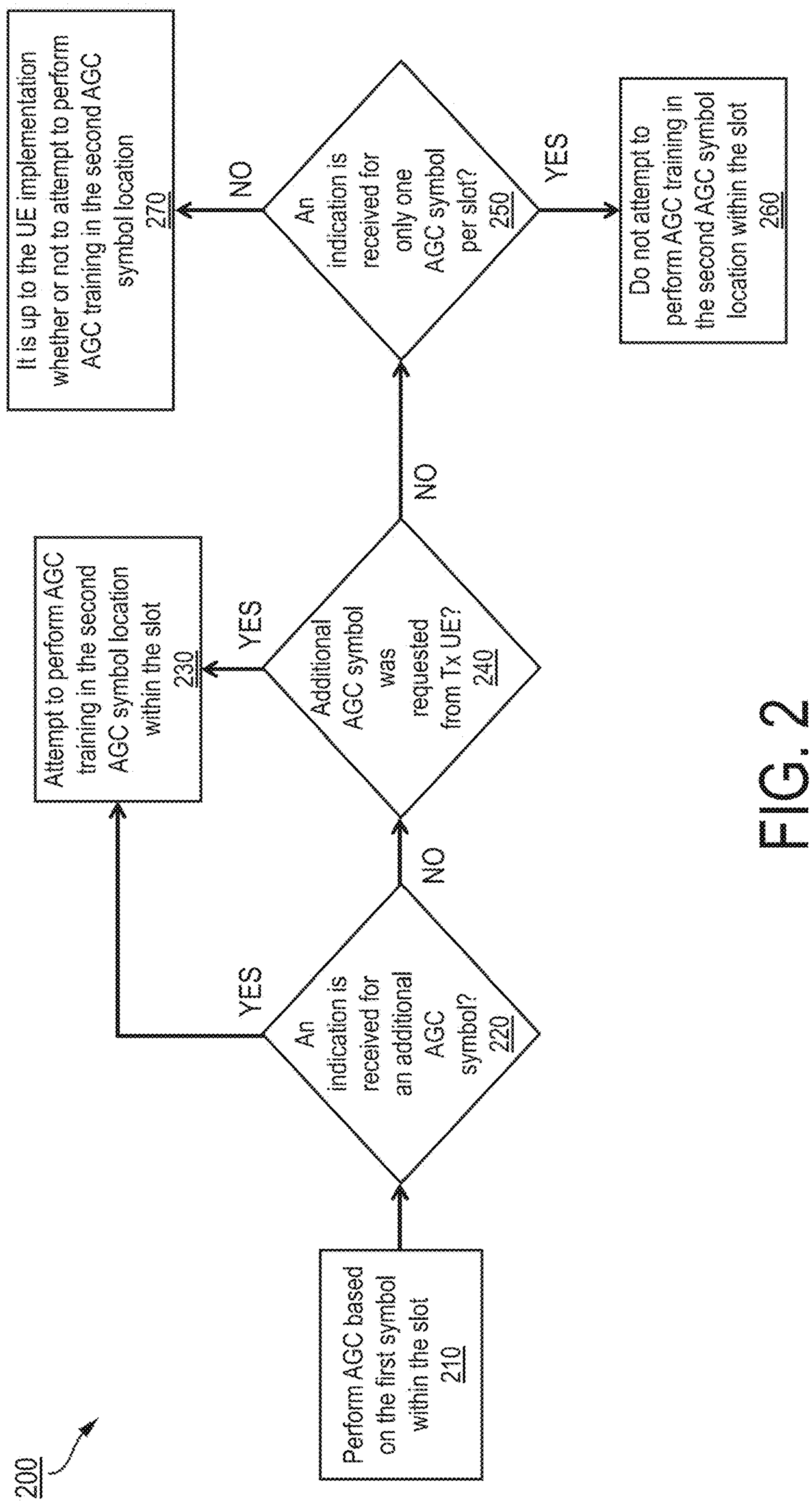
FIG. 2 is a flowchart illustrating an example method for indicating presence of additional AGC symbols in a slot according to various embodiments.

FIG. 2 is a flowchart illustrating an example method for indicating presence of additional AGC symbols in a slot according to various embodiments. Specifically, process 200 relates to a method for determining whether to attempt to perform AGC multiple times, by an Rx UE, based on indications received during other operations. Process 200 begins at step 210, whereby a first AGC operation is performed within the slot. At step 220, it is determined whether an indication is received for an additional AGC symbol in the slot. For example, the indication may be received via SCI information in a PSCCH slot, as depicted in FIG. 1. If the determination is made affirmatively, the process 200 proceeds to step 230, where the Rx UE will attempt to perform a second AGC operation, namely AGC training, in the second AGC symbol location within the slot.

If, in step 220, no indication is received, the process 200 proceeds to step 240 wherein it is determined if an additional AGC symbol was requested from a Tx UE communicating with the Rx UE. If step 240 is made affirmatively, the process 200 also proceeds to step 230 where the second AGC operation is performed. If, in step 240, no request was made, the process 200 proceeds to step 250, wherein it is determined if an indication is received that only one AGC symbol it utilized per slot. If step 250 is made affirmative, the process 200 proceeds to step 260, where the Rx UE will refrain from performing AGC training on the second AGC symbol location within the slot. If, in step 250, no indication is received, then the Rx UE has received no information regarding the existence of a potential second AGC symbol in the slot. Thus, at step 270, the Rx UE may determine its own course of implementation, whether to attempt to perform a second AGC operation. This decision may be based on, for example, pre-configured instructions stored at the UE.

In various embodiments, the Tx UE can dynamically indicate the number of AGC symbols per slot to the neighboring Rx UE(s). In various embodiments, the indication of the number of AGC symbols in a slot can be carried in the $1^{st}$ or $2^{nd}$ stage SCI or as a MAC CE. In various embodiments, the indication of the number of AGC symbols in a slot can be either explicit by setting one or more bits in the $1^{st}$ or $2^{nd}$ stage SCI or MAC CE or implicit by setting one or more fields to pre-defined values. In various embodiments, the number of possible AGC symbols per slot can be (pre)-configured per resource pool and an index carried in the $1^{st}$ or $2^{nd}$ stage SCI or as a MAC CE can be used to indicate the selected number of AGC symbols per slot.

In various embodiments, the number of AGC symbols per slot can be dependent on one or more of the following parameters: 1) the transmission priority; 2) the TB being a transmission or a retransmission; 3) the number of blind retransmissions; 4) the cast type; 5) contention window size; 6) the number of ACK/NACKs received during a reference duration; 7) measured CBR; and/or 8) explicit request or capability exchange from the Rx UE. In various embodiments, the number of AGC symbols per slot can be selected by the Rx UE in case of inter-UE coordination. In various embodiments, in case of resource selection assistance Scheme 1, the Rx UE can indicate the number of AGC symbols along with the preferred or non-preferred resource sets to the Tx UE. In various embodiments, in case of resource selection assistance Scheme 2, the Rx UE can use a (pre)-configured PSFCH resource to indicate the number of AGC symbols per slot to be used by the Tx UE. This can be either sent separately from the conflict indication or by applying a cyclic shift on the PSFCH resource used for conflict indication in the resource selection assistance Scheme 2.

Exchange of UE Capabilities

NR UEs are expected to perform LBT before transmitting in the unlicensed band. For reasons discussed above, it is beneficial to have multiple potential starting positions within a slot. However, this approach can result in altering the interference and energy level within the slot, thus hindering the quality of the AGC training performed at the first symbol of the slot. A UE may transmit two AGC symbols within a slot to maintain the AGC training quality and improve the transmission reliability at the expense of lower slot efficiency.

However, it is not always necessary to send an additional AGC symbol. In fact, such transmission can reduce the slot efficiency without achieving any gains, for example in the following scenarios: 1) when the Rx UE does not have the capability to process two AGC symbols within a slot due to its limited processing power; and/or 2) when the Rx UE can perform advanced processing to adjust its AGC gain without the need for an additional AGC symbol (e.g., by relying on any other reference signals such as DMRS).

Thus, there is a need in the art for new exchanges of UE capabilities between the Tx and Rx UEs regarding use of additional AGC symbols. Embodiments of such exchanges may involve cases where we unicast and groupcast transmission are utilized, or for broadcast transmissions wherein the ability to transmit additional AGC symbol can be enabled or disabled by resource pool pre-configuration.

In various embodiments, exchange of UE capabilities may be done through RRC signaling during the discovery phase when the UE pairing is performed for unicast transmission or it can be done at a later stage as necessary. In this case, the Tx UE may exchange an indication of the ability to transmit 2 or more AGC symbols per slot and the Rx UE may exchange an indication of whether it can process additional AGC symbols per slot or not and its necessity. For example, a parameter may be added (e.g., additional-AGC) to indicate the Tx UE capability of transmitting multiple AGC symbols per slot. This field may be used to indicate multiple AGC symbols within a slot. From the Rx UE perspective, two parameters may be added (e.g., maxAGC-SL and additional-AGC-req) to indicate the Rx UE capability of processing an additional AGC symbol in a slot and the need for an additional AGC symbol for training adjustments, respectively.

Figure 3:
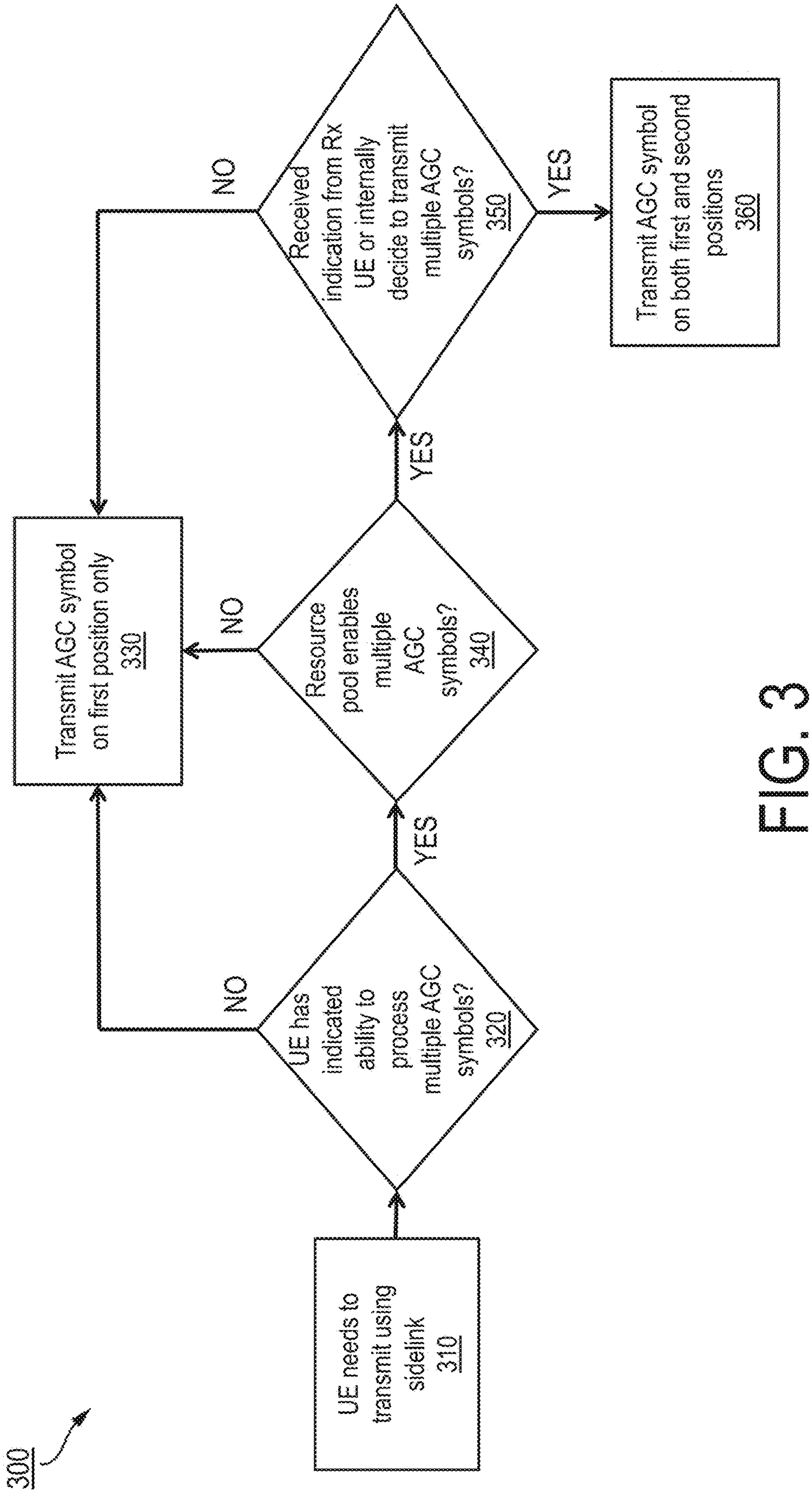
FIG. 3 is a flowchart illustrating an example method for UE capability exchange to indicate additional AGC symbols is a slot according to various embodiments.

FIG. 3 depicts an example flow chart for determining a number of AGC symbols for transmission. Specifically, process 300 relates to a method for determining whether to transmit an AGC symbol in a first and second position, by a Tx UE, based on indications received during other operations. Process 300 begins at step 310, whereby a determination is made that the Tx UE shall transmit in sidelink to another Rx UE. At step 320, it is determined whether the Rx UE has sent an indication including the ability for the Rx UE to process multiple AGC symbols. If the determination is made negatively, the process 300 proceeds to step 330, where the Tx UE will transmit only a first AGC symbol in the first position.

If, in step 320, such an indication is received, the process 300 proceeds to step 340 wherein it is determined if the resource pool from which the device draws has the capability to provide for multiple AGC symbols in a slot. If step 240 is made negatively, the process 300 also proceeds to step 330 where the Tx UE will transmit only a first AGC symbol in the first position. If step 340 is made affirmatively, the process 300 proceeds to step 350, wherein it is determined if the Tx UE has received an indication from the Rx UE of its conditions, and/or determined based on specifications internal to the Tx UE, whether to transmit multiple AGC symbols in the slot. If step 350 is made negatively, the process again proceeds to step 330, where the Tx UE will transmit only a first AGC symbol in the first position. If step 350 is made affirmatively, the Tx UE will transmit AGC symbols on both the first and at least a second position in the slot.

In various embodiments, the transmission of additional AGC symbols per slot can be enabled or disabled based on UE capability exchange in case of groupcast and unicast transmissions. In various embodiments, the transmission of additional AGC symbols per slot can be enabled or disabled based on resource pool (pre)-configuration in case of broadcast, unicast and groupcast. In various embodiments, a new parameter can be added at the Tx UE side to indicate its ability to transmit two or more AGC symbols per slot. In various embodiments, two new parameters are added to the Rx UE side to indicate its ability to process additional AGC symbols per slot and the necessity of the additional AGC symbol.

Modified Mini-slot Approach on Mode 2 Resource Selection Procedure

Mini-slot utilization may increase the chances of NR UEs in acquiring the channel since they are allowed only to transmit at slot boundaries. When following this approach, an NR UE is not expected to trigger resource reselection until the failure of the last LBT sensing opportunity within the slot when mini-slots are (pre)-configured for a resource pool. For example, if a resource reselection is performed after an LBT failure while still there exists following candidate starting positions within the slot, then the initial reselected slot is the same initial slot but with the following candidate starting position. In NR sidelink, pre-emption has been introduced, whereby a UE with higher priority can pre-empt the resources reserved by a neighboring low priority UE. However, in some cases, the high priority UE can be blocked from channel access due to LBT failure.

Systems and methods described herein described allowance of the pre-empted UE to reuse the pre-empted resource in order to reduce the latency and increase the resource utilization approach. This can be done, for example, by allowing a pre-empted UE to attempt to transmit in any mini-slot following the first one. In various embodiments, the pre-emption can be applied only on the first starting position within a slot to further improve the resource utilization. Collisions will not occur between the NR UEs in this case due to LBT sensing. For example, if the higher priority UE that triggered the pre-emption was able to acquire the channel and perform the transmission, then the lower priority UE will be able to detect its presence when performing the LBT sensing and accordingly will not be able to perform the transmission due to LBT failure.

Figure 4:
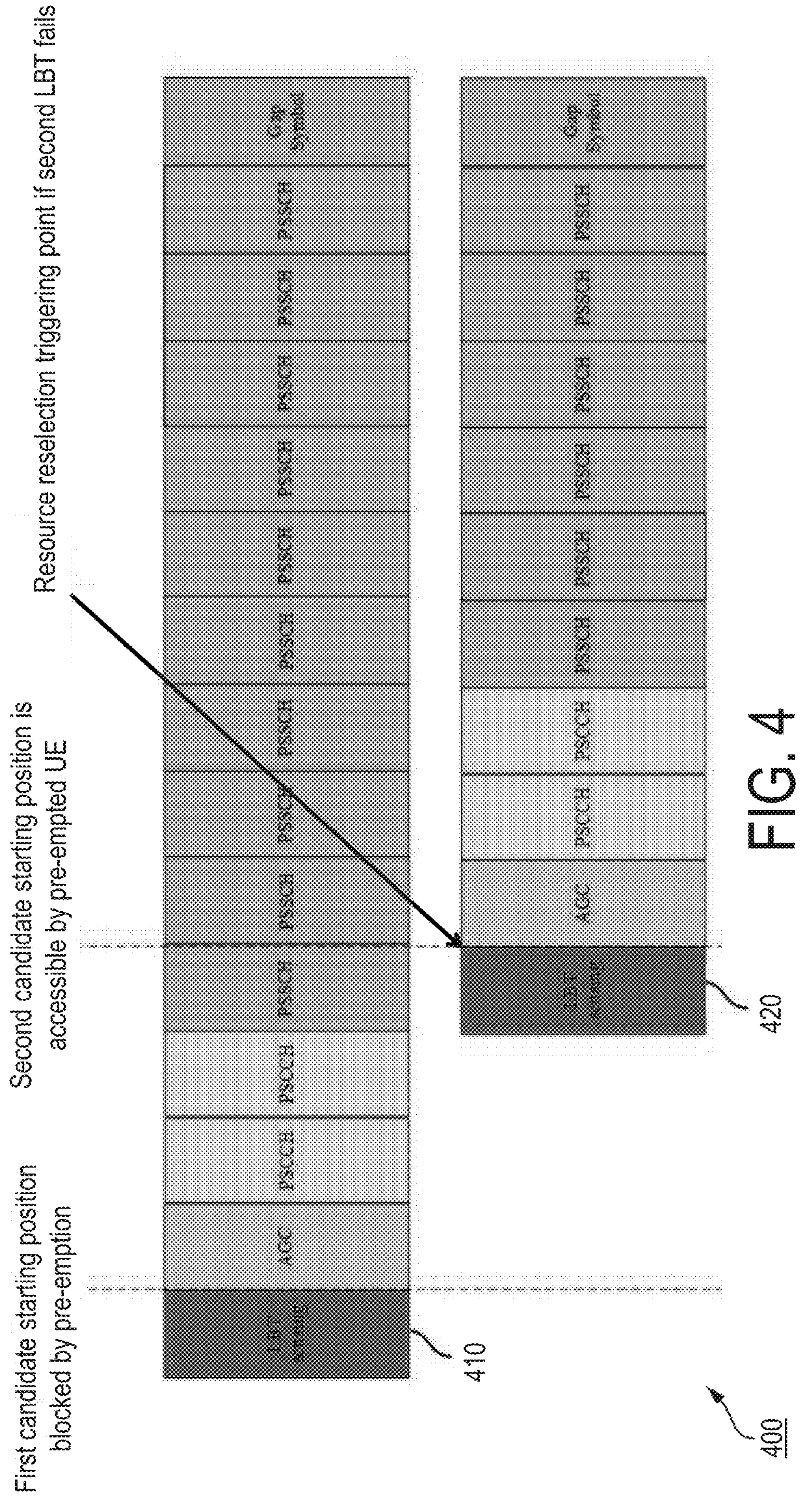
FIG. 4 depicts a block diagram illustrating an example slot for resource preemption according to various embodiments.

FIG. 4 depicts a block diagram illustrating an example slot for resource preemption according to various embodiments. Specifically, FIG. 4 depicts a set of transmissions 400 subject to preemptions according to the embodiments described herein. As shown in FIG. 4, LBT sensing is performed at a first candidate starting position 410, but is blocked by preemptions due to a higher priority UE. However, in cases where LBT sensing fails for the higher priority UE, the lower priority UE may again attempt LBT sensing at the second candidate starting position 420, which is now accessible to the lower priority UE due to the higher priority UE failing LBT sensing. If second LBT sensing fails at the second candidate starting point 420, then resource reselection may be triggered.

In various embodiments, a resource re-selection may be triggered to replace pre-empted resources once a reservation by a higher priority UE is received. In such a case, if the pre-empted UE was able to find an earlier replacement resource then the pre-empted resource can be cancelled. In alternative embodiments, if the pre-empted UE is unable to find an earlier replacement resource, it may follow the approach described hereinabove and attempt to perform LBT in any candidate starting position within the slot, except the first one. Subsequently, if LBT is successful, the replacement resource can be either used for re-transmitting the current TB or sending a new TB or it can be released to be used by neighboring UEs. In various further embodiments, a release indication is not transmitted to avoid transmitting too much control signals.

In various embodiments, when mini-slots are pre-configured for a resource pool, resource reselection triggering can be delayed after the last candidate LBT sensing within the slot. In various embodiments, a pre-empted UE can be allowed by resource pool pre-configuration to transmit on a pre-empted resource if it has a successful LBT for any candidate starting position within a slot other than the first one.

AGC Retraining for Mini-Slot Enabled Slots

As discussed herein, utilizing an additional AGC symbol within a slot provides advantages in retraining the AGC and accordingly avoiding deteriorating signal quality. However, performance gains often come at the expense of reducing the slot efficiency, since one additional symbol will be used for AGC training rather than data transmission. To address this drawback, embodiments discussed herein include utilizing Mode 2 resource reservations in identifying UEs that failed LBT at the beginning of the slot, but still will transmit in the following candidate location within the slot. In particular, if a neighboring UE reserved slot "X" for transmission but didn't transmit from the beginning of the slot due to LBT failure, then this neighboring UE may transmit in the following candidate starting position within the slot. Subsequently, a UE may automatically estimate the energy transmitted by the neighboring UE and automatically adjust its AGC to maintain the signal quality without relying on the presence of an additional AGC symbol.

In various embodiments, the following steps may explain the procedure in a case where we have two possible starting positions within a slot:

1) A UE identifies neighboring UEs that are expected to transmit at a future slot (e.g., slot "X") based on their future reservations indicated by their SCIs (e.g., either based on periodic or aperiodic reservation indicated in SCI) and creates a UE candidate list "S."
2) The UE estimates the received energy from these neighboring UEs in S based on the measured reference signal (e.g., RSRP).
3) The UE associates a validity timer for the estimated received energy by each of the neighboring UEs in S to avoid using outdated energy measurements (often in case of periodic reservations).
4) At slot X, a UE begins by attempting to decode the SCIs for each of the neighboring UEs in S based on their previous reservations and accordingly detects which UEs in S succeeded in performed their transmissions from the beginning of the slot.
5) For each neighboring UE that is not detected, it is expected that this neighboring UE will start its transmission at the second candidate starting position within the slot and accordingly a list "R" is created that contains these UEs.
6) Initialize a value "E"=0. For each UE in R, the UE adds the estimated received energy of this UE to an E if its validity timer is still active, otherwise if the timer is invalid, the UE may: a) discard the estimated energy for this UE; b) add the estimated energy for this UE; and/or c) add a pre-configured energy value for this UE.
7) The UE then adjusts its AGC training by targeting the value E at the beginning of the second candidate position within the slot X.

In various embodiments, a set of restrictions are applied to ensure an accurate adjustment of the AGC training, including, for example, only UEs that declared a future reservation to their neighbors (i.e., their resources are reserved by a transmitted SCI) will be allowed to transmit in the $2^{nd}$ candidate starting position within future slot X; and/or ii) only UEs that declared a future reservation within a given duration (i.e., their validity timer will be active at slot X) will be allowed to transmit in the $2^{nd}$ candidate starting position within future slot X.

Figure 5:
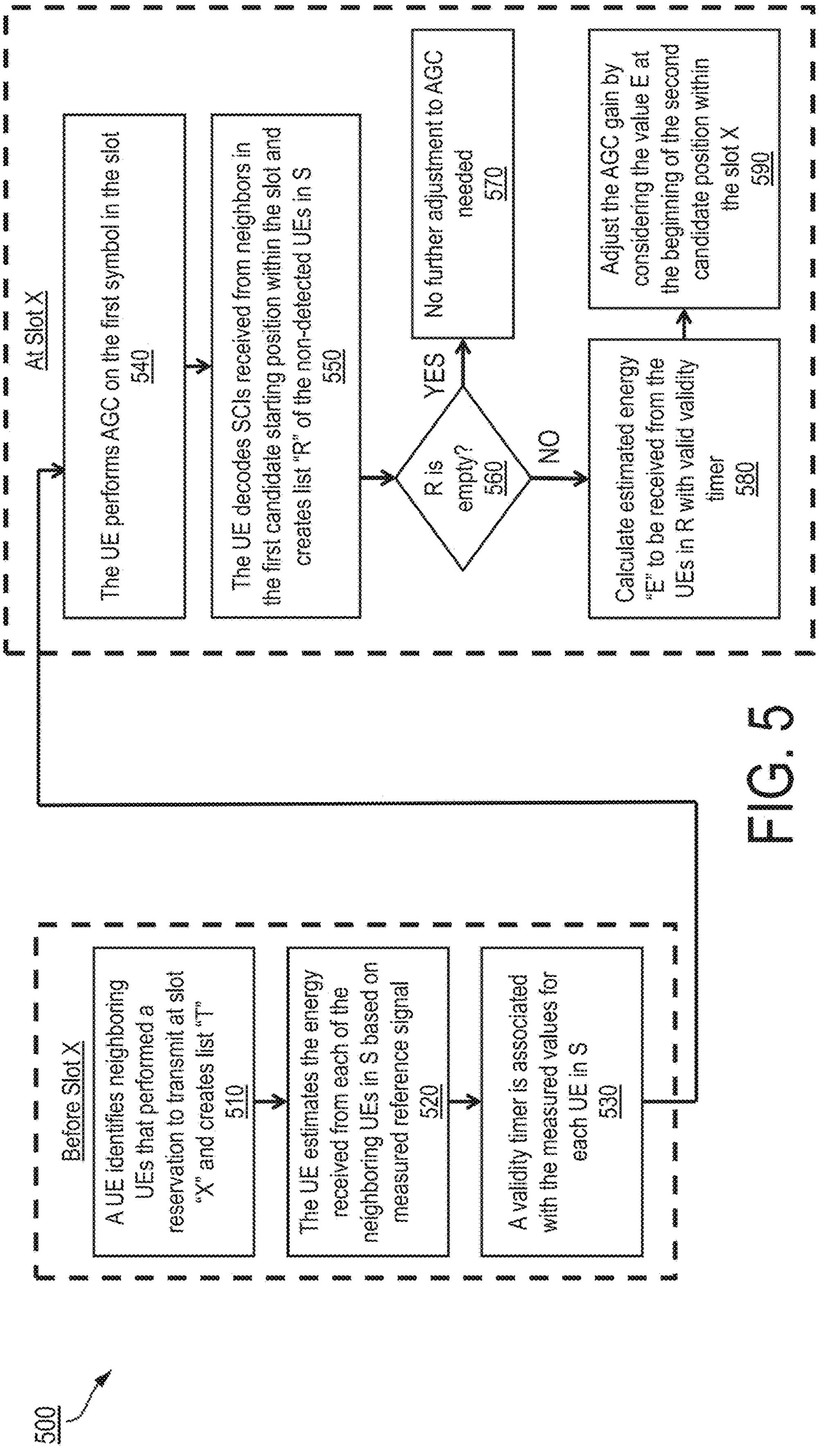
FIG. 5 is a flowchart illustrating an example method for AGC slot retraining with mini-slots according to various embodiments.

FIG. 5 is a flowchart illustrating an example method for AGC slot retraining with mini-slots according to various embodiments. Specifically, FIG. 5 depicts an example process 500 for adjusting AGC gains according to a several factors. Process 500 begins at step 510 wherein a UE identifies neighboring UEs that have performed a reservation to transmit at a slot "X" and create a list "S" of those neighboring UEs. At step 520, the UE estimates the energy received from each of the neighboring UEs in the list S based on the measured reference signals. At step 530, a validity time is associated with the measured values for each UE in the list S. Each of steps 510-530 begins before slot "X" is processed according to the time domain.

The process 500 then proceeds to step 540 concurrent with the processing of slot X in the time domain. At step 540, the UE performed AGC on the first symbol in the slot. At step 550, the UE decodes the SCIs received from its neighboring UEs in the first candidate starting position within the slot and creates a new list "R" of the non-detected UEs in S. At step 560, a determination is made as to whether the list R is empty, meaning there are no non-detected UEs in S, the process 500 proceeds to step 570 where no further adjustments to the AGC are needed. Alternatively, if R is not empty at step 560, the process 500 proceeds to step 580 where the estimated energy E to be received from the UEs in R with a valid validity time is calculated. At step 590, the AGC gain is adjusted according to the value E at the beginning of the second candidate position within the slot X.

In various embodiments, a UE can adjust its AGC training at slot X based on the estimated energy to be received by its neighboring UEs that performed a reservation at slot X. In various embodiments, the energy to be received by a neighboring UE can be measured based on reference signals received (e.g., by measuring RSRP based on the received SCI).

In various embodiments, the measured energy by a neighboring UE can be associated with a validity timer to avoid using outdated energy measurements (often in case of periodic reservations). In various embodiments, the UE identifies the neighboring UEs that are expected to transmit in slot X based on their received reservations before slot X and the decoded SCIs at slot X.

In various embodiments, for slots with two candidate starting positions, the UE readjusts its AGC gain based on the total estimated energy of the UEs that are expected to be transmitting in the 2nd candidate starting position within a slot X. This adjustment is done at the first symbol of the 2nd candidate starting position within a slot X. In various embodiments, to enable the conservative AGC adjustment procedure, only UEs that performed a previous reservation and have an active validity timer can be allowed to transmit in the 2nd candidate starting position within a slot.

Aggregation of HARQ Feedback of Multiple TBs in a Single Slot:

When operating in the coexistence band, an NR UE will be required to perform LBT sensing before transmitting in the coexistence band. This applies to both, PSSCH/PSCCH and PSFCH transmissions. Given this restriction, a UE might fail to transmit its HARQ feedback if it does not have a successful LBT. In such cases, multiple PSFCH occasions may be pre-configured for each TB transmission to increase the chances of the NR to have a successful LBT and transmit its HARQ ACK/NACK feedback. Despite the advantages of this approach to combat LBT failures, a UE will be required to send an HARQ codebook to the Tx UE which can increase the overhead and reduce the reliability of the PSFCH channel.

To address this drawback, systems and methods are described herein for utilizing a reduced HARQ codebook. The reduced HARQ codebook may be used, for example, that in the following concepts of groupcast Option 1: 1) a specific cyclic shift can be used to ACK All pending TBs; 2) an ACK only approach can be considered wherein an absence of an ACK indicates a NACK (this can be dynamically indicated with a bit in the HARQ codebook). This dynamic indication can be helpful when the number of ACKs is less than the number of NACKs; 3) A NACK only approach can be considered wherein an absence of a NACK indicates an ACK (This can be dynamically indicated with a bit in the HARQ codebook). This dynamic indication can be helpful when the number of NACKs is less than the number of ACKs; or 4) any combination of the above approaches.

In an example embodiment, if a UE is required to transmit ACK/NACK for 4 TBs to the same UE due to LBT failures, and all of them were correctly received, it may use only one PSFCH resource (e.g. a selected PRB and cyclic shift in a specific PSFCH occasion) to indicate an all ACK to all the TBs. This helps reduces power consumption because only one PSFCH sequence will need to be sent. This also increases the chances of having a successful detection of the PSFCH feedback because more power can be allocated to the sent sequence.

In an alternative embodiment, if a combination of successful and failed TBs need to be subject to an ACK/NACK (e.g., two TBs need to be subject to ACK while another two need to be subject to NACK), then the UE may follow an ACK only approach and send only two Zadoff Chu sequences to the Tx UE in two PSFCH resources. In this case, if the Tx UE receives these two sequences then two TBS will be subject to ACK and implicitly two TBs will be subject to NACK due to the missing NACK sequences. This helps in reducing the power consumption since only two PSFCH sequence will need to be sent. This also increases the chances of having a successful detection of the PSFCH feedback since more power can be allocated to the sent sequences. The UE may identify the exact TBs that are subject to ACK since there may exist a one-to-one mapping between the PSFCH resources used and the corresponding TBs that need to be subject to ACK or NACK.

In various embodiments, a HARQ codebook can be used to indicate an ACK/NACK feedback to multiple TBs simultaneously to a Tx UE based on any of the following rules: 1) a specific cyclic shift can be used to perform ACK on all pending TBs; 2) an ACK-only approach can be considered wherein an absence of an ACK indicates a NACK; 3) a NACK-only approach can be considered wherein an absence of a NACK indicates an ACK; or 4) any combination of the above approaches.

In various embodiments, from the Tx UE perspective, the exact TBs that are subject to ACK/NACK can be either implicitly or explicitly identified based on the resource mapping rules and the received PSFCH feedback.

Control Signaling in Cyclic Prefix Extension (CPE)

When operating in the coexistence band, an NR UE is required to perform LBT sensing before transmitting in the coexistence band. If a UE has a successful LBT, it will still have to wait until the upcoming slot boundary or the mini-slot boundary to perform a transmission. In this case, the channel can be lost to other systems. To address this drawback, similar to NR-U, it is expected that an NR UE will send a CPE to maintain the channel until the upcoming slot boundary in which the actual data and control information can be transmitted. To allow frequency multiplexing of multiple NR UEs in the same slot, it is expected that all NR UEs will share a specific starting position for transmitting their CPE (e.g., within the symbol just before the next AGC symbol and can be dependent on priority).

Despite the advantages of this approach in allowing frequency multiplexing of NR UES, there is a significant impact on the ability of NR UEs to have a successful LBT especially when the system is highly occupied. When performing LBT, a UE performs sensing for a randomly selected duration (i.e., a random number less than the contention window size) based on its estimated channel occupancy and thus there is no guarantee that it will have a successful LBT just before the CPE transmission starting position. Accordingly, there will exist a gap between the end of the LBT sensing and the specific starting position for sending the CPE. During this gap, the NR UE can end up losing the channel to other systems (e.g., Wifi).

To address this drawback, systems and methods are described herein that allow for NR UEs to be frequency multiplexed, by utilizing a common interlace along with the CPE. More specifically, a common interlace may be pre-configured per resource pool and can be used by all UEs. Since this common interlace is known, by all NR UEs, they can identify that the channel reservation is done by an NR UE and accordingly perform frequency multiplexing based on their Mode 2 sensing and resource selection procedure. In addition, the CPE and the common interlace can be immediately sent after having a successful LBT thus preventing other systems from occupying the channel.

Figure 6:
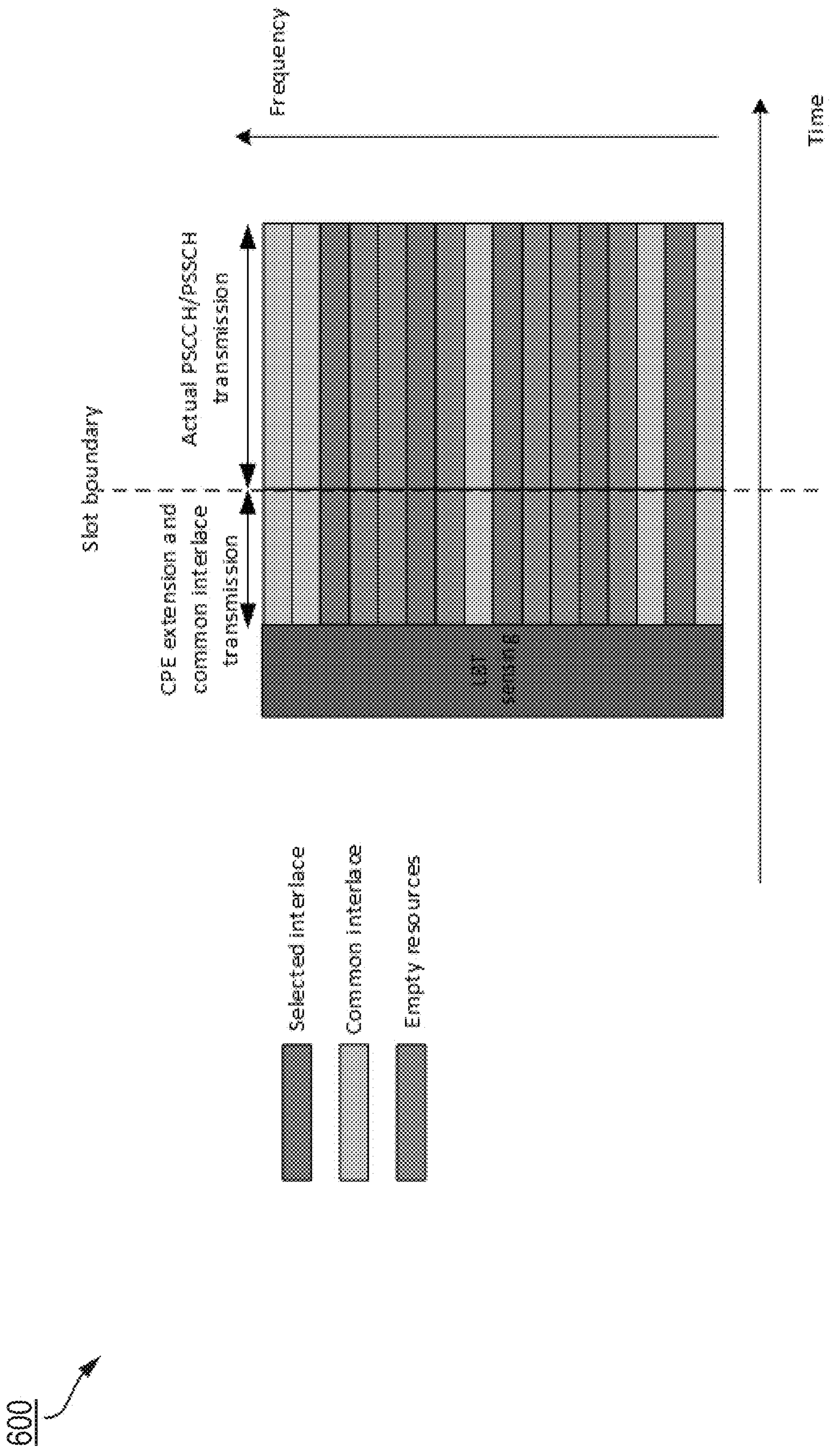
FIG. 6 depicts a block diagram illustrating an example slot for resource preemption according to various embodiments.

FIG. 6 depicts a block diagram illustrating an example slot for resource preemption according to various embodiments. Specifically, FIG. 6 depicts an example transmission 600 to enable frequency multiplexing. As depicted in FIG. 6, following LBT sensing, the common interface and CPE may be sent concurrently along with any empty resources to enable frequency multiplexing.

This approach will allow the NR UEs to send their CPE extension earlier to perform the channel reservation and avoid losing the channel to other systems and at the same time without blocking the frequency multiplexing of NR UEs. In various embodiments, to allow frequency multiplexing of multiple NR UEs, an NR UE can send a common interlace along with the CPE extension to indicate that the channel reservation is performed by an NR UE.

In various embodiments, a neighboring NR UE that detects the common interlace will identify the channel as occupied by an NR UE and accordingly can transmit in the upcoming slot based on its Mode 2 sensing and resource selection procedure. In various embodiments, an NR UE can immediately occupy the channel after having a successful LBT by sending a CPE along with a common interlace to block transmissions of other systems.

Example System Architecture

Figure 7:
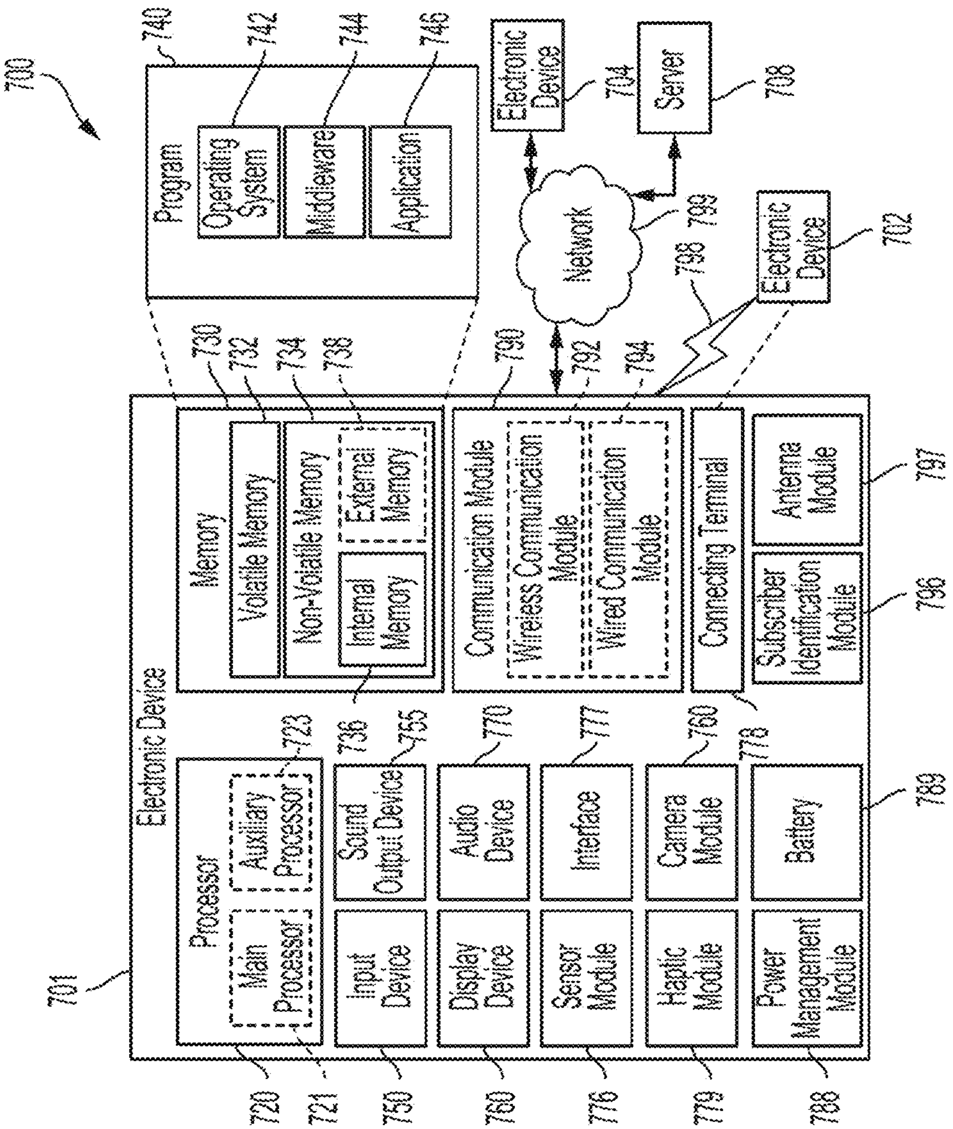
FIG. 7 is a block diagram of an electronic device in a network environment 700, according to an embodiment. The electronic device of FIG. 7 may comprise the receiving UE or transmitting UE performing the functions and embodiments described herein, such as those illustrated in FIGS. 1-6.

FIG. 7 is a block diagram of an electronic device in a network environment 700, according to an embodiment. The electronic device of FIG. 7 may comprise the receiving UE or transmitting UE performing the functions and embodiments described herein, such as those illustrated in FIGS. 1-6.

Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 794. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally, or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Figure 8:
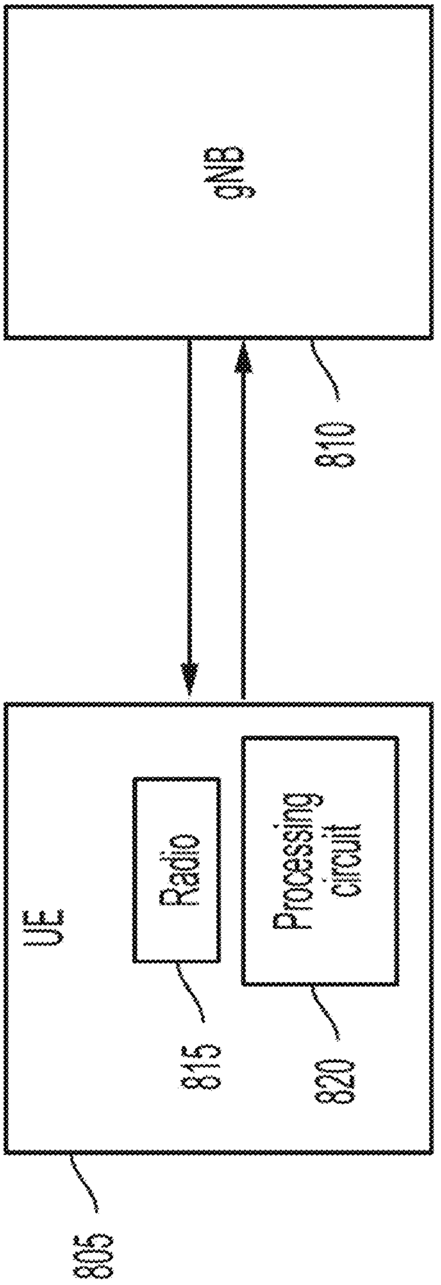
FIG. 8 shows a system including a UE and a gNB, in communication with each other.

FIG. 8 shows a system including a UE 805 and a gNB 810, in communication with each other. The UE may include a radio 815 and a processing circuit (or a means for processing) 820, which may perform various methods disclosed herein. For example, the processing circuit 820 may receive, via the radio 815, transmissions from the network node (gNB) 810, and the processing circuit 820 may transmit, via the radio 815, signals to the gNB 810.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively, or additionally, the program instructions may be encoded on an artificially-generated propagated signal, e.g., a machine-generated electrical, optical, or electromagnetic signal, which is generated to encode information for transmission to suitable receiver apparatus for execution by a data processing apparatus. A computer-storage medium may be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium may also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

processing, by a user equipment (UE), a first automatic gain control (AGC) symbol at a first block of a first slot of a wireless transmission;

receiving, by the UE in the first slot of the wireless transmission, an indication of a number of AGC symbols for processing in the first slot of the wireless transmission; and determining, by the UE and based on the indication received, whether to process at least a second AGC symbol of the first slot of the wireless transmission.

2. The method of claim 1, further comprising refraining, by the UE and based on the determination, from processing a second AGC symbol, wherein the determination is based on information in the indication that only one AGC symbol is transmitted in the first slot of the wireless transmission.

3. The method of claim 1, further comprising processing, by the UE and based on the determination, at least a second AGC symbol.

4. The method of claim 3, wherein the indication includes information that at least the second AGC symbol exists in a subsequent slot of the wireless transmission.

5. The method of claim 1, further comprising sending, by the UE to a separate transmitting (Tx) UE, a request to send the wireless transmission comprising multiple AGC symbols, wherein the indication is based on the request sent to the Tx UE.

6. The method of claim 5, further comprising receiving, by the UE from the Tx UE, the wireless transmission.

7. The method of claim 5, wherein the request sent to the Tx UE to send the wireless transmission comprising multiple AGC symbols comprises a pre-configured physical sidelink feedback channel (PSFCH) resource including a preferred number of AGC symbols to a separate transmitting UE, and wherein the indication received by the UE is sent by the Tx UE based on the PSFCH resource.

8. The method of claim 1, wherein the indication is included in sidelink control information (SCI) of one or more physical sidelink control channel (PSCCH) blocks subsequent to the first AGC symbol.

9. The method of claim 8, wherein the SCI indicates at least an additional AGC symbol subsequent to the one or more PSCCH blocks.

10. The method of claim 1, wherein the indication is part of medium access control control element (MAC CE) and is carried in a physical sidelink shared channel (PSSCH).

11. A first UE device comprising:

a processor; and a memory including instructions, wherein when the instructions are executed by the processor, the first UE device is configured to:

establish a sidelink connection with a second UE device;

receive from the second UE via radio resource control, an indication comprising a first parameter indicating whether the second UE is capable of processing multiple automatic gain control (AGC) symbols per transmission; and determine, based on the indication and the capability of the first UE to transmit multiple AGC symbols per transmission, whether to transmit a first AGC symbol and a second AGC symbol to the second UE device.

12. The first UE device of claim 11, wherein the first UE device is further configured to:

transmit, based on the determination, the first AGC to the second UE device on a first AGC symbol and refrain from transmitting the second AGC symbol to the second UE device.

13. The first UE device of claim 12, wherein the indication includes information indicating that the second UE does not have the ability to process multiple AGC symbols.

14. The first UE device of claim 12, wherein the determination is further based on a determination that a shared resource pool between the first UE and the second UE does not enable multiple AGC symbols to be utilized.

15. The first UE device of claim 11, wherein the indication further comprises a second parameter indicating whether it is necessary for the second UE to process multiple AGC symbols per slot.

16. The first UE device of claim 11, wherein transmission of the second AGC symbol can be enabled or disabled based on a resource configuration available to the first UE device and the second UE device in case of one or more of broadcast, unicast, and groupcast operations.

17. A UE device comprising:

a processor; and a memory including instructions which, when executed by the processor, cause the UE device to:

process a first automatic gain control (AGC) symbol at a first block of a first slot of a wireless transmission;

receive, in the first slot of the wireless transmission, an indication of a number of AGC symbols for processing in the first slot of the wireless transmission; and determine, based on the indication received, whether to process at least a second AGC symbol of the first slot of the wireless transmission.

18. The UE device of claim 17, wherein the instructions, when executed by the processor, further cause the UE device to refrain, based on the determination, from processing a second AGC symbol, wherein the determination is based on information in the indication that only one AGC symbol is transmitted in the first slot of the wireless transmission.

19. The UE device of claim 17, wherein the instructions, when executed by the processor, further cause the UE device to process, based on the determination, at least a second AGC symbol.

20. The UE device of claim 19, wherein the indication includes information that at least the second AGC symbol exists in a subsequent slot of the wireless transmission.

* * * * *